(No Model.)
W. HURLBURT & B. B. HAVENS.
HORSE COLLAR PAD.
No. 340,509. Patented Apr. 20, 1886.
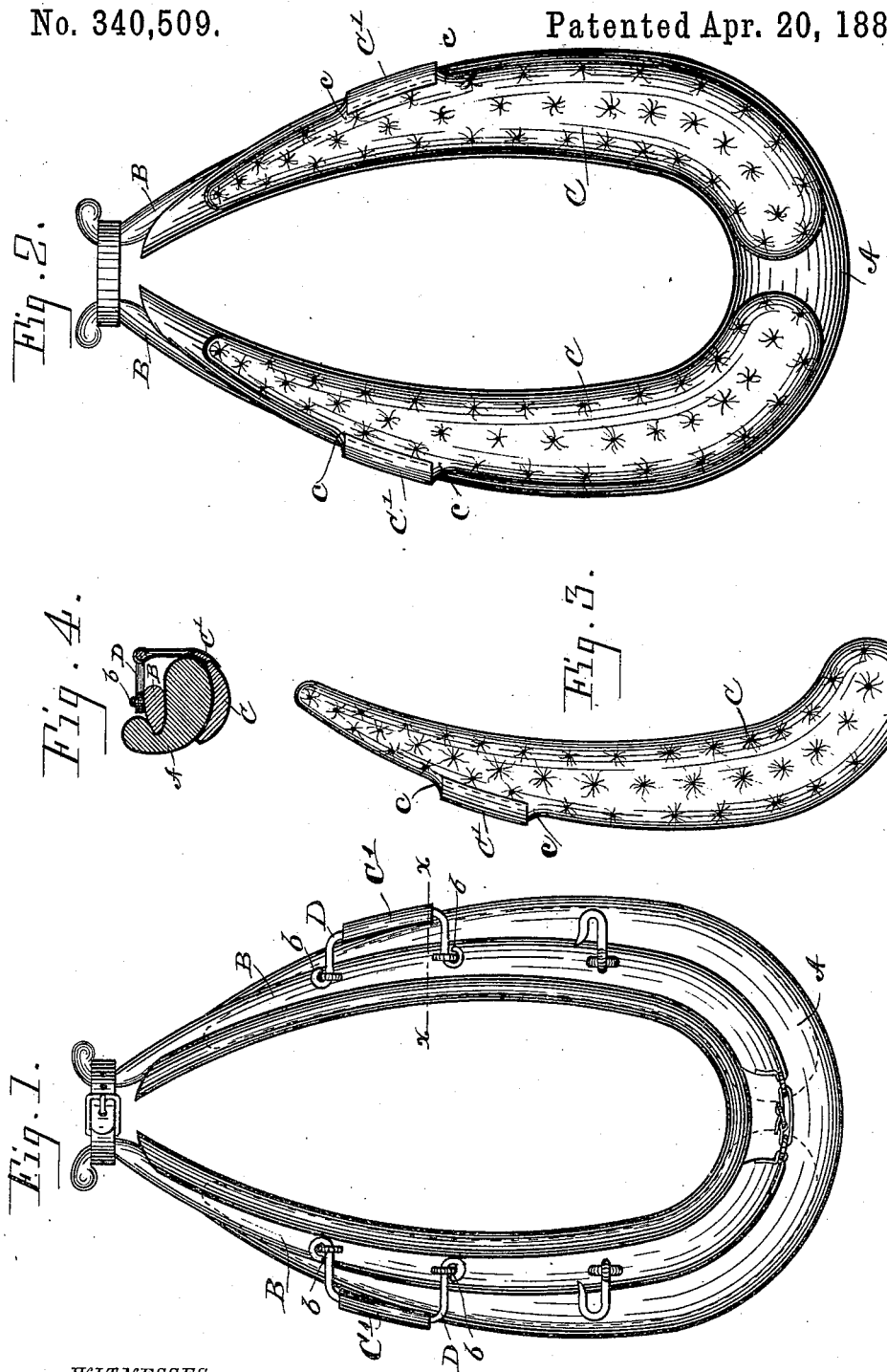

UNITED STATES PATENT OFFICE.

WILLIAM HURLBURT AND BYRON B. HAVENS, OF RUSHVILLE, NEW YORK.

HORSE-COLLAR PAD.

SPECIFICATION forming part of Letters Patent No. 340,509, dated April 20, 1886.

Application filed February 5, 1886. Serial No. 190,901. (No model.)

*To all whom it may concern:*

Be it known that we, WILLIAM HURLBURT and BYRON B. HAVENS, citizens of the United States, residing at Rushville, in the county of Yates and State of New York, have invented certain new and useful Improvements in Anti-Friction Collar-Pads; and we do hereby declare the following to be a full, clear, and exact description of the invention, such as will enable others skilled in the art to which it appertains to make and use the same.

The object of this improvement is to provide a pad for horse-collars, adapted by its construction and mode of connection to the same to preventing the collar from galling and producing sores on horses' breasts. These results are attained by the means illustrated in the drawings herewith filed, in which the same letters of reference denote the same parts in the different views.

Figure 1 is a front elevation of a horse-collar provided with a pad constructed and connected to the collar in the manner of our improvement. Fig. 2 is a view of the same inverted. Fig. 3 is a representation of the pad detached. Fig. 4 is a transverse section of the collar, pad, hame, and pad-connection taken on the lines $x\,x$ of Fig. 1.

A is the collar.

B B are hames of ordinary construction.

C C are pads made according to the plan of our improvement—that is, made with a profile corresponding to the bearing-surface of the collar, substantially as shown, and provided with loops C' C', formed of pieces of leather or other appropriate material, stitched or otherwise suitably secured to a lip or outward extension of the body of the pad, (shown at $c\,c$.)

D D' are wires or leather thongs inserted through the loops on the pads C C, and suitably connected to staples fixed to the hames, as shown at $b\,b$. The wires or thongs D may be used for connecting the pads to the collar instead of the hames.

When the thongs are used instead of wires D D', they may be inserted through the loops C' of the pads C, and tied to the staples $b\,b$ on the hames, substantially as shown for the wires D D', or they may be tied to the collars.

By reason of the pads being connected to the hames or collar in the manner shown and described, the pads will cling to the shoulders or breast of the horse during the vibrations of the collar inseparable from the variations in the draft, and will thus prevent the same from producing sores, as stated; and for the reasons mentioned the pads can be used advantageously on horses with sore breasts, as the same will protect the sores from irritation, and thus allow the same to heal during the employment of the animal.

Having explained the features of our improvement, what we claim as new, and desire to secure by Letters Patent, is—

In combination with a horse-collar, a pad having a profile agreeing substantially with the body of the collar, and provided with loops C', adapted to receive wires or thongs for connecting the pad to the collar in a manner adapted to allow the collar to move without changing the position of the pad, as and for the purpose set forth.

In testimony whereof we affix our signatures in presence of two witnesses.

WILLIAM HURLBURT.
BYRON B. HAVENS.

Witnesses:
S. S. CATLIN,
D. R. VOORHEES.